United States Patent
Nishino

(10) Patent No.: US 8,271,679 B2
(45) Date of Patent: Sep. 18, 2012

(54) SERVER MANAGEMENT DEVICE

(75) Inventor: Shuji Nishino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 690 days.

(21) Appl. No.: 11/221,733

(22) Filed: Sep. 9, 2005

(65) Prior Publication Data

US 2006/0218297 A1 Sep. 28, 2006

(30) Foreign Application Priority Data

Mar. 17, 2005 (JP) ................................ 2005-078171

(51) Int. Cl.
*G06F 15/173* (2006.01)
(52) U.S. Cl. ........ 709/238; 709/223; 709/224; 709/225; 709/226; 709/227; 710/1; 711/100; 711/173
(58) Field of Classification Search .......... 709/223–227; 710/1; 711/114–173; 714/104
See application file for complete search history.

(56) References Cited

U.S. PATENT DOCUMENTS

| | | | |
|---|---|---|---|
| 5,878,232 A | 3/1999 | Marimuthu | |
| 6,247,109 B1 * | 6/2001 | Kleinsorge et al. | 712/13 |
| 6,330,555 B1 * | 12/2001 | Weber | 1/1 |
| 6,742,099 B1 * | 5/2004 | Mendoza et al. | 711/173 |
| 6,771,606 B1 * | 8/2004 | Kuan | 370/248 |
| 6,990,520 B2 * | 1/2006 | Green et al. | 709/223 |
| 6,996,607 B2 * | 2/2006 | Mizuno | 709/214 |
| 7,000,025 B1 * | 2/2006 | Wilson | 709/235 |
| 7,024,510 B2 * | 4/2006 | Olarig | 710/311 |
| 7,127,585 B2 * | 10/2006 | Shimada et al. | 711/173 |
| 7,206,772 B2 * | 4/2007 | Tolley | 706/46 |
| 7,275,050 B2 * | 9/2007 | Fujimoto | 711/100 |
| 7,349,961 B2 * | 3/2008 | Yamamoto | 709/224 |
| 7,350,050 B2 * | 3/2008 | Nakamura et al. | 711/173 |
| 7,451,175 B2 * | 11/2008 | Green et al. | 709/200 |
| 7,486,626 B1 * | 2/2009 | Mountcastle | 370/254 |
| 7,499,454 B2 * | 3/2009 | Fan et al. | 370/395.4 |
| 7,539,129 B2 * | 5/2009 | Nishino | 370/216 |
| 7,587,483 B1 * | 9/2009 | Florissi et al. | 709/223 |
| 7,590,719 B2 * | 9/2009 | Mashima et al. | 709/223 |
| 7,609,654 B2 * | 10/2009 | Lubeck et al. | 370/254 |
| 7,610,584 B2 * | 10/2009 | Brooks et al. | 718/100 |
| 7,676,600 B2 * | 3/2010 | Davies et al. | 709/250 |
| 7,720,957 B2 * | 5/2010 | Graham et al. | 709/223 |
| 2002/0161891 A1 * | 10/2002 | Higuchi et al. | 709/226 |
| 2003/0072260 A1 * | 4/2003 | Janoska et al. | 370/229 |

(Continued)

FOREIGN PATENT DOCUMENTS

EP 0977457 2/2000

(Continued)

OTHER PUBLICATIONS

European Patent Office Action, dated Oct. 23, 2006, and issued in related European Patent Application No. 05 013 581.3-2416.

(Continued)

*Primary Examiner* — Backhean Tiv
(74) *Attorney, Agent, or Firm* — Staas & Halsey LLP

(57) ABSTRACT

A CPU obtains the component information of the hardware resources for each partition when dividing a system board and IO unit which are the hardware resources of a computer server, provided by the system manager, into a plurality of partitions and assigning them to the plurality of partitions, and sets a switching hub, based on the component information of these hardware resources.

6 Claims, 12 Drawing Sheets

U.S. PATENT DOCUMENTS

| | | | |
|---|---|---|---|
| 2003/0208642 A1* | 11/2003 | Desai et al. | 710/1 |
| 2004/0025052 A1* | 2/2004 | Dickenson | 713/201 |
| 2005/0004998 A1* | 1/2005 | Mizuno | 709/219 |
| 2005/0010715 A1* | 1/2005 | Davies et al. | 711/100 |
| 2005/0044228 A1* | 2/2005 | Birkestrand et al. | 709/226 |
| 2005/0091454 A1* | 4/2005 | Shimada et al. | 711/114 |
| 2006/0064698 A1* | 3/2006 | Miller et al. | 718/104 |
| 2006/0174003 A1* | 8/2006 | Wilson et al. | 709/225 |
| 2006/0195617 A1* | 8/2006 | Arndt et al. | 710/1 |
| 2007/0022427 A1* | 1/2007 | Arndt | 718/104 |
| 2007/0283093 A1* | 12/2007 | Zohar et al. | 711/114 |
| 2010/0049822 A1* | 2/2010 | Davies et al. | 709/213 |

FOREIGN PATENT DOCUMENTS

| | | |
|---|---|---|
| JP | 10-224382 | 8/1998 |
| JP | 2000-049789 | 2/2000 |
| WO | 01/23974 | 4/2001 |

OTHER PUBLICATIONS

Office Action issued in corresponding European Patent Application No. 05 013 581.3, on Mar. 25, 2008.

Japanese Office Action issued Jan. 26, 2010 in corresponding Japanese Application No. 2005-078171.

\* cited by examiner

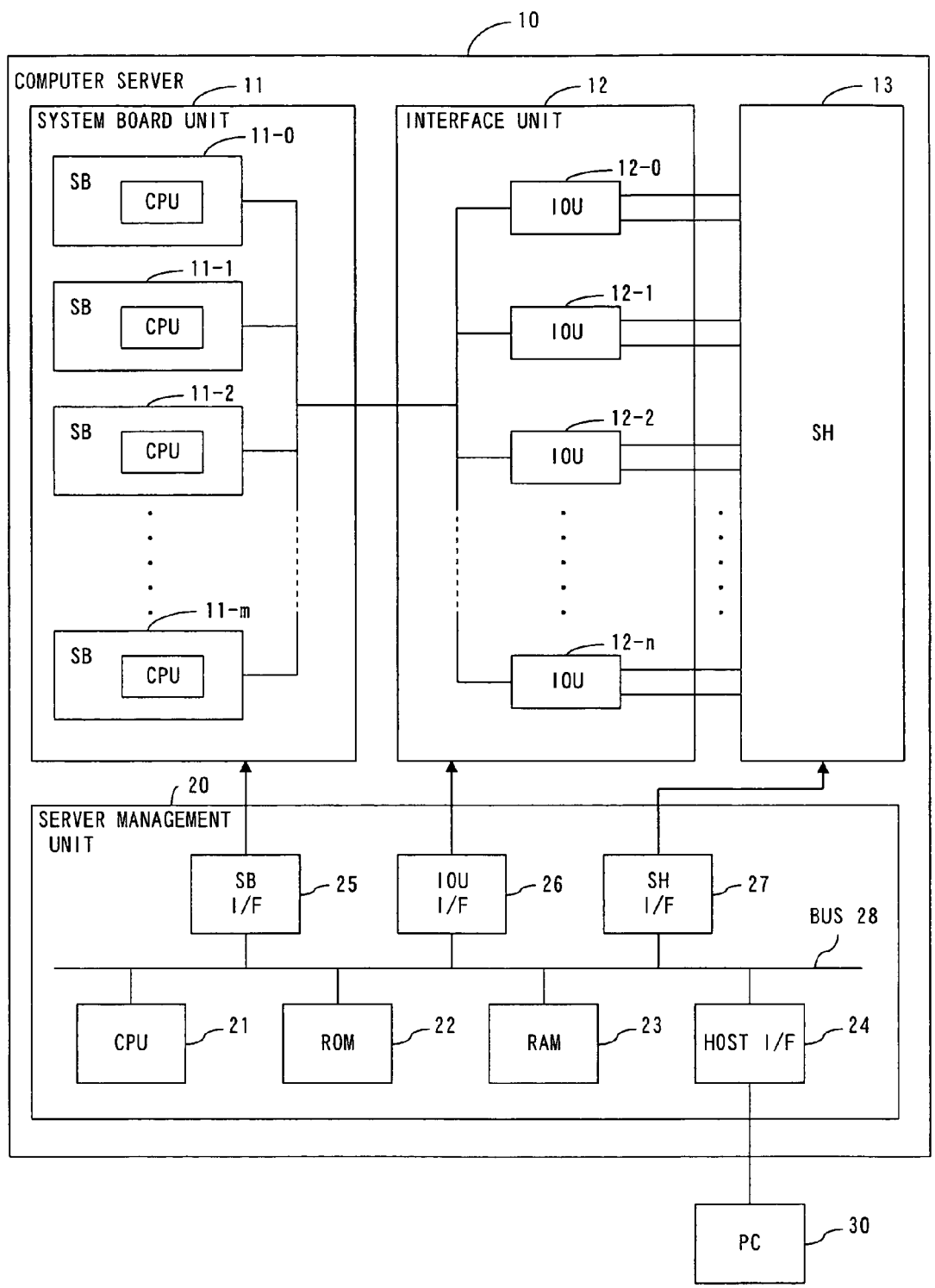
F I G. 1

| # | Partition Name | Status | Power Status | SB 0 | 1 | 2 | 3 | 4 | 5 | 6 | 7 | IOU 0 | 1 | 2 | 3 | 4 | 5 | 6 | 7 |
|---|---|---|---|---|---|---|---|---|---|---|---|---|---|---|---|---|---|---|---|
| 0 | | None | | | | | | | | | | | | | | | | | |
| 1 | A-group server | OK | On | ● | | | | | | | | ● | | | | | | | |
| 2 | File server | OK | On | | | | | ● | | | | | ● | | | | | | |
| 3 | Project Web server | OK | Standby | | | | | | ● | | | | ● | | | | | | |
| 4 | test | OK | Standby | | | | | | | ● | | | ● | | | | | | |
| 5 | abc | OK | Standby | | | | | | | | ● | | ● | | | | | | |
| 6 | | None | | | | | | | | | | | | | | | | | |
| 7 | | None | | | | | | | | | | | | | | | | | |

F I G. 2

PRIOR ART

| IOU | None | Port | Tag | # | Partition Name |
|---|---|---|---|---|---|
| 0a | O | O | O | | |
| 0b | O | O | O | | |
| 1a | O | O | O | | |
| 1b | O | O | O | | |
| 2a | O | O | O | | |
| 2b | O | O | O | | |
| 3a | O | O | O | | |
| 3b | O | O | O | | |
| 4a | O | O | O | | |
| 4b | O | O | O | | |
| 5a | O | O | O | | |
| 5b | O | O | O | | |
| 6a | O | O | O | | |
| 6b | O | O | O | | |
| 7a | O | O | O | | |
| 7b | O | O | O | | |

FIG. 3A

PRIOR ART

| IOU | None | Port | Tag | # | Partition Name |
|---|---|---|---|---|---|
| 0a | ○ | ● | ○ | 1 | A-group server |
| 0b | ○ | ● | ○ | 1 | A-group server |
| 1a | ○ | ○ | ● | 2 | File server |
| 1b | ○ | ○ | ● | 4 | test |
| 2a | ● | ○ | ○ | 3 | Project Web server |
| 2b | ● | ○ | ○ | 5 | abc |
| 3a | ○ | ○ | ○ | Free | |
| 3b | ○ | ● | ○ | 2 | File server |
| 4a | ○ | ○ | ○ | Free | |
| 4b | ○ | ○ | ○ | Free | |
| 5a | ○ | ○ | ○ | Free | |
| 5b | ○ | ○ | ○ | Free | |
| 6a | ○ | ○ | ○ | Free | |
| 6b | ○ | ○ | ○ | Free | |
| 7a | ○ | ○ | ○ | Free | |
| 7b | ○ | ○ | ○ | Free | |

FIG. 3B

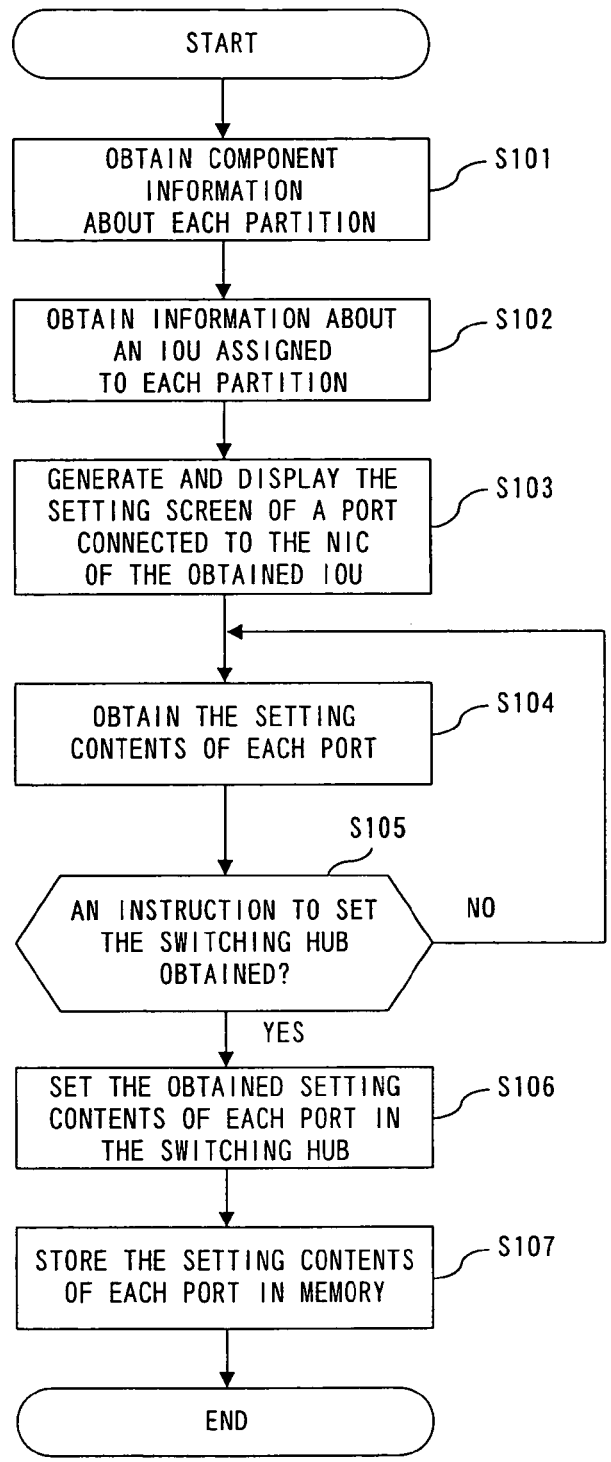
F I G. 4

| # | Partition Name | IOU | None | Port | Tag |
|---|---|---|---|---|---|
| 1 | A-group server | 0a | ○ | ○ | ○ |
| | | 0b | ○ | ○ | ○ |
| 2 | File server | 1a | ○ | ○ | ○ |
| | | 3b | ○ | ○ | ○ |
| 3 | Project Web server | 2a | ○ | ○ | ○ |
| 4 | test | 1b | ○ | ○ | ○ |
| 5 | abc | 2b | ○ | ○ | ○ |

FIG. 5A

| # | Partition Name | IOU | None | Port | Tag |
|---|---|---|---|---|---|
| 1 | A-group server | 0a | ○ | ● | ○ |
|   |                | 0b | ○ | ● | ○ |
| 2 | File server    | 1a | ○ | ○ | ● |
|   |                | 3b | ○ | ● | ○ |
| 3 | Project Web server | 2a | ● | ○ | ○ |
| 4 | test | 1b | ○ | ○ | ● |
| 5 | abc | 2b | ● | ○ | ○ |

FIG. 5B

| # | Partition Name | IOU | Current | | Setting Status |
|---|---|---|---|---|---|
| | | | Status | Speed/Duplex | |
| 1 | A-group server | 0a | — | — | ☐Enable |
| | | 0b | — | — | ☐Enable |
| 2 | File server | 1a | — | — | ☐Enable |
| | | 3b | — | — | ☐Enable |
| 3 | Project Web server | 2a | — | — | ☐Enable |
| 4 | test | 1b | — | — | ☐Enable |
| 5 | abc | 2b | — | — | ☐Enable |

F I G. 6 A

| # | Partition Name | IOU | Current | | Setting Status |
|---|---|---|---|---|---|
| | | | Status | Speed/Duplex | |
| 1 | A-group server | 0a | UP | 1000M/Full | ■Enable |
| | | 0b | UP | 1000M/Full | ■Enable |
| 2 | File server | 1a | Down | — | □Enable |
| | | 3b | Down | — | ■Enable |
| 3 | Project Web server | 2a | Down | — | ■Enable |
| 4 | test | 1b | Down | — | □Enable |
| 5 | abc | 2b | Down | — | ■Enable |

FIG. 6B

| # | Partition Name | Status | Power Status | SB | | | | | | | | IOU | | | | | | | |
|---|---|---|---|---|---|---|---|---|---|---|---|---|---|---|---|---|---|---|---|
| | | | | 0 | 1 | 2 | 3 | 4 | 5 | 6 | 7 | 0 | 1 | 2 | 3 | 4 | 5 | 6 | 7 |
| 0 | | None | | | | | | | | | | | | | | | | | |
| 1 | A-group server | OK | On | ● | | | | | | | | ● | | | | | | | |
| 2 | File server | OK | On | | | | | ● | | | | | ● | | ● | | | | |
| 3 | Project Web server | OK | Standby | | | | | | ● | | | | ● | | | | | | |
| 4 | test | OK | Standby | | | | | | | ● | | ▓ | ● | | | | | | |
| 5 | abc | OK | Standby | | | | | | | | ● | | ● | ▓ | | | | | |
| 6 | | None | | | | | | | | | | | | | | | | | |
| 7 | | None | | | | | | | | | | | | | | | | | |

F I G. 7

| # | Partition Name | IOU | None | Port | Tag |
|---|---|---|---|---|---|
| 1 | A-group server | 0a | ○ | ● | ○ |
| | | 0b | ○ | ● | ○ |
| 2 | File server | 1a | ○ | ○ | ● |
| | | 3b | ○ | ● | ○ |
| 3 | Project Web server | 2a | ● | ○ | ○ |
| 4 | test | 2b | ○ | ○ | ● |
| 5 | abc | 1b | ● | ○ | ○ |

FIG. 9

SERVER MANAGEMENT DEVICE

BACKGROUND OF THE INVENTION

1. Field of the Invention

The present invention relates to an information processing technology, and more particularly relates to the technology of a computer system capable of dividing a hardware resource into a plurality of partitions and operating them.

2. Description of the Related Art

Although recently a large-scaled multi-processor computer server system has been promoted, in some computer server system, the number of partitions can be modified and each partition can also be modified, based on the load of a process by theoretically dividing the hardware resource of a system, such as a central processing unit (CPU), a main storage device (memory), or the like into a plurality off partitions and operating each partition as an independent computer system. In such a system, if each partition is provided with a local area network (LAN) function, a switching hub (line concentration device with a switching function is connected to a network interface card (hereinafter omitted as "NIC"), which is a LAN controller, and is incorporated into the system, instead of simply providing the NIC conventionally. This method enables more flexible networking building. For example, if there remain unused LAN ports in the system, a large amount of transmission capacity and its performance can be improved, by bundling and using a plurality of LAN ports. Such a system can also dissolve the complication and troublesomeness due to the increase of wiring cables caused by the expansion of its system scale.

Such a switching hub has a variety of functions, which are actually utilized in such a system provided with the above-mentioned switching hub.

For example, a virtual LAN (VLAN) function, which is one of such functions can be used to make each partition independent and to prevent partitions from unintentionally communicate with each other.

Furthermore, for example, a link aggregation function, which is such another function, can be used to secure a large amount of transmission capacity by assigning a plurality of NICs to one partition and bundling them.

Concerning the present invention, for example, Japanese Patent Application No. H10-224382 discloses a technology for dynamically rebuilding the VLAN of a network/device and solving network problems, such as the looping of a data packet, the collision of an address, a broadcast stream or the like.

The above-mentioned setting of a variety of operating condition for a switching hub provided for a computer server system must be made after the system manager firstly detects the components of a hardware resource distributed to each partition and then the connection condition between a NIC distributed to each partition and a switching hub, which is very complicated and troublesome.

If the components of a partition are modified after the completion of such a setting, the system manager must also reset the switching hub according to the modification.

SUMMARY OF THE INVENTION

It is an object of the present invention to assist the setting work of a switching hub to be connected to a computer server system.

A server management device in one aspect of the present invention manages a computer server. The server management device comprises a component information acquisition unit for acquiring the component information of the relevant hardware resource for each partition when dividing the hardware resource of the computer server into a plurality of partitions and assigning them to the plurality of partitions and a setting unit for setting a switching hub connected to the computer server, based on the component information.

According to this configuration, since a switching hub connected to the computer server is set based on the component information of a hardware resource for each partition, the setting work of a switching hub by the system manager can be simplified.

In the above-mentioned server management device of the present invention, the component information can also include information about the assignment to the relevant partition of an interface unit for providing interface with the switching hub for each port of the switching hub in the computer server and the setting unit can also set the switching hub, based on the assignment information about the interface unit.

According to this configuration, since a switching hub connected to the computer server can be set based on the assignment information for each partition about the relevant interface unit, the setting work of the switching hub by the system manager can be simplified.

In this case, the server management device can also further comprise a setting information acquisition unit for obtaining the setting information for each port of the relevant switching hub in accordance with a partition to use the port, and the setting unit can also further set the switching hub, based on the setting information.

According to this configuration, since the setting information for each port of the switching hub can be correlated to a partition to use the port, setting information and component information can be correlated by a partition. Accordingly, the setting unit can appropriately set the switching hub.

In this case, the server management device can also further comprise a component modification information acquisition unit for obtaining the modification information of the component information, and the setting unit can also take over the setting based on the setting information and as to the setting based on the component information, modify it based on the modification information.

According to this configuration, since the setting of a port corresponding to the relevant partition is taken over, regardless of the modification of a partition component, no complicated and troublesome setting modification work of the switching hub by the system manager is needed.

If the computer server is installed together with the server management device of the present invention and the switching hub in a single cabinet, the same function/effect as the server management device can be obtained.

By adopting such a configuration, the present invention can help the system manager to set a switching hub connected to the computer server system.

BRIEF DESCRIPTION OF THE DRAWINGS

The present invention will be more apparent from the following description when the accompanying drawings are referenced.

FIG. 1 shows the configuration of a computer server implementing the present invention.

FIG. 2 shows an example of component information for each partition.

FIG. 3A shows an example of the conventional setting screen of the operating condition of the VLAN function for each port of a switching hub.

FIG. 3B shows an example of the setting made for the conventional setting screen exemplified in FIG. 3A.

FIG. 4 is a flowchart showing the contents of a switching hub operational setting process.

FIG. 5A shows an example of the setting screen of the operating condition of the VLAN function for each port of a switching hub generated by the process shown in FIG. 4.

FIG. 5B shows an example of the setting made for the setting screen exemplified in FIG. 5A.

FIG. 6A shows an example of the setting screen of operation/non-operation of each port of a switching hub generated by the process shown in FIG. 4.

FIG. 6B shows an example of the setting made for the setting screen exemplified in FIG. 6A.

FIG. 7 shows an example of the modification of component information for each partition.

FIG. 9 shows an example of the setting screen after the switching hub operational setting modification process is performed.

DESCRIPTION OF THE PREFERRED EMBODIMENTS

Figure 8:
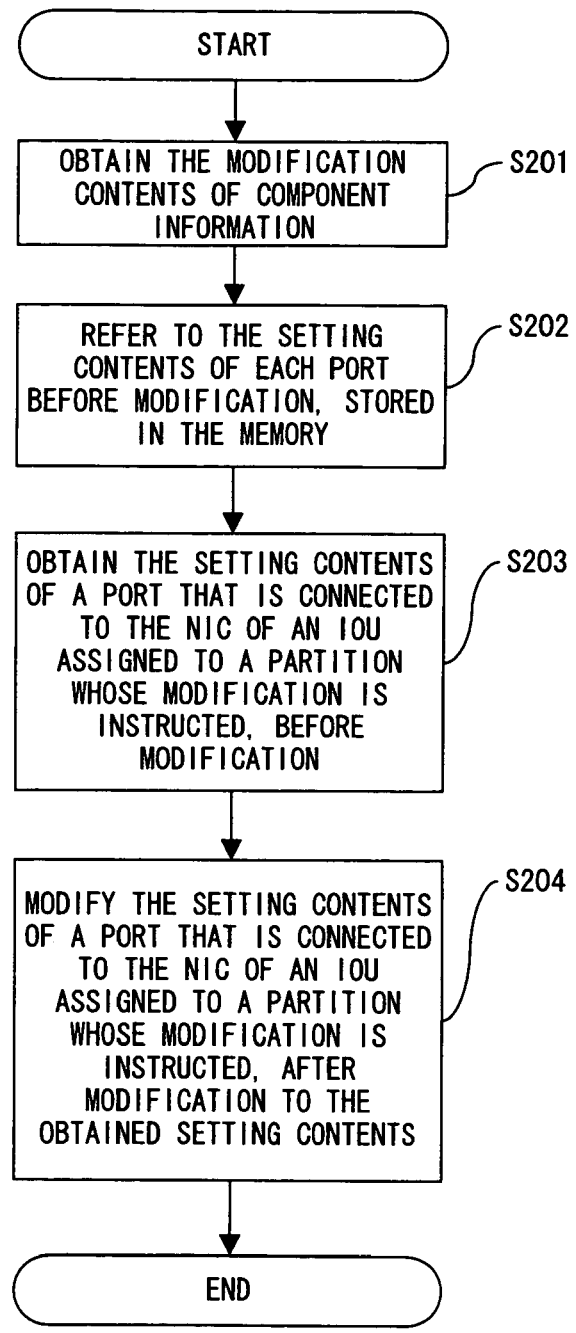
FIG. 8 is a flowchart showing the contents of a switching hub operational setting modification process.

The preferred embodiments of the present invention are described below with reference to the drawings.

FIG. 1 shows the configuration of a computer server implementing the present invention.

A computer server 10 comprises a system board unit 11, an interface unit 12, a switching hub 13 and a sever management unit 20 in a single cabinet.

In the system board unit 11, system boards (SB) 11-0, 11-1, 11-2, . . . , 11-m (hereinafter described "SB11-m") provided with a central processing unit (CPU) to be assigned to each partition are installed.

In the interface unit 12, IO units (IOU) 12-0, 12-1, 12-2, . . . , 12-n (hereinafter described "IOU"12-n) for providing each port of the switching hub 13 with an interface between SB11-m and the switching hub 13 are installed. In this preferred embodiment, each of IOU 12-n has two NICs, and one of IOU12-n and the two ports of the switching hub 13 are physically connected.

The switching hub (SH) 13 is a line concentration device provided with a switching function and is publicly known. Alternatively, the SH 13 can be removed from the computer server 10 and can be separately used. In this case, IOU 12-n and the port of SH13 can physically connected.

The server management device 20 distributes and assigns SB 11-m and IOU 12-n, which are the hardware resources of the computer server 10, into a plurality of partitions, and also sets a variety of operating condition for each port of the SH 13, based on the component information. The server management unit 20 manages the transmission/reception of a variety of data between SB 11-m and IOU 12-n.

As shown in FIG. 1, the server management unit 20 comprises a CPU 21, ROM 22, RAM 23, a host interface (host I/F) 24, a system board interface (SBI/F) 25, an IO unit interface (IOUI/F) 26 and a switching-hub interface (SHI/F) 27, between which a variety of data is transmitted/received via a bus 28 managed by the CPU 21.

The CPU 21 is a central operation device for controlling the entire server management unit 20 and further controlling the entire operation of this computer server 10 by executing a control program.

The ROM 22 is memory for storing the control program executed by the CPU 21 beforehand.

The RAM 23 is memory used as working memory as requested when the CPU 21 executes the control program.

The host I/F 24 manages the transmission/reception of a variety of data to/from a PC 30 used by the system manager.

The SBI/F 25 manages the transmission/reception of a variety of data to/from each SB11-m of the system board unit 11.

The IOUI/F 26 manages the transmission/reception of a variety of data to/from each IOU 12-n of the interface unit 12.

The SHI/F 27 manages the transmission/reception of a variety of data to/from the SH 13.

The server management unit 20 can also be removed from the computer server 10 and can also be used as a server management device for managing the computer server 10.

Next, the component information transmitted from the PC 30 to the computer server 10 is described. This component information indicates the assignment to each partition of the hardware resource of the computer server 10, and is generated by the manager of the computer server 10.

FIG. 2 shows an example of the component information for each partition.

The item in each column of FIG. 2 is described below. The number in the first column indicates a number given for convenience' sake in order to identify a partition, and "Partition Name" in the second column indicates a description given to each partition by the manager. Although in FIG. 2, eight partitions in total, "0" through "7" are indicated, the number of partitions is not limited to eight.

Then, "Status" in the third column indicates the existence/non-existence of the operational problem of a corresponding partition. If this item is described as "OK", it indicates that it can operate normally. If this item is described as "None", a corresponding partition is not used.

The "Power Status" in the fourth column indicates the current operating condition of a corresponding partition. If this item is described as "On", it indicates that it is currently operating. If this item is described as "Standby", it indicates that a corresponding partition is waiting for being operated.

The items in third and fourth columns in the table of FIG. 2 indicate the current statuses of a partition, and are not component information.

The "SB" in a subsequent column specifies SB11-m to be assigned to each partition.

If, for example, an item "SB" in "A-Group server", which is partition "1", is referenced, a column "0" is checked with a black round mark. The manager operating the PC 30 checks this round mark, which it indicates that one SB11-m in number "0" is assigned to partition "1".

Although in FIG. 2, one SB11-m is assigned to each partition, a plurality of SB11-m can also be assigned.

An item "IOU" at the right end in the table of FIG. 2 specifies IOU 12-n to be assigned to each partition.

If in FIG. 2, for example, "IOU" in "A-Group server", which is partition number "1", is referenced, each of the upper and lower sides of a columns "0" is checked with a black round marks. The manager operating the PC 30 checks these round marks, which indicates that both of two NICs provided for IOU 12-n "0" are assigned to partition "1". For example, if "IOU" in "File server", which is partition number "2", is referenced, each of the upper side of a column "1" and the lower side of a column "3" is checked with a black round mark, which indicates that one of the NICs (temporarily called "NICa") provided for IOU 12-n "1" and the other (temporarily called "NICb") provided for IOU 12-n "3" are assigned to partition "2".

The number of NICs to be assigned to each partition can be arbitrarily set in the same way as in the assignment of SB 11-*m*.

When operating the computer server 10, firstly the manager generates the above-mentioned component information by operating the PC 30. The generated component information is transmitted from the PC 30 to the server management unit 20 of the computer server 10. The CPU 21 of the server management unit 20 distributes/assigns the respective NICs of SB 11-*m* and IOU 12-*n* to each partition, based on the component information transmitted from the PC 30 to operate it.

Then, the setting information of a variety of operating condition for each port of the SH 13 is generated. In the following example, the setting information of the operating condition of the VLAN function for each portion is generated.

Conventionally, this entire setting information is also generated by the manager. For example, the setting of the operating condition of a VLAN for each port of the SH 13 that is physically connected to each of two NICs possessed by each IOU 12-*n*, as shown in the table of FIG. 3A, is made by checking it with a black round mark as shown in FIG. 3B.

The item in each column of each of FIGS. 3A and 3B is described below. An item "IOU" in the first column indicates a reference numeral for individually specifying two NICs possessed by each IOU 12-*n*. For example, "0*a*" indicates one of the NICs of the $0^{th}$ IOU 12-*n* and "0*b*" indicates the other of the $0^{th}$ IOU 12-*n*.

Then, one of "None" in the second column, "Port" in the third column and "Tag" in the fourth column is selected for each NIC. By checking it with a black round mark, the operating condition of the VLAN function of the port of the SH 13, connected to a corresponding NIC is set. In this case, the check of "None" indicates that the relevant port does not the VLAN function. The check of "Port" indicates that a so-called port function, that is, a LAN function to divide the network into groups for each port is used. The check of "Tag" indicates a so-called tag VLAN function, that is, a VLAN function to the network into groups by identifier (tag) attached to a communication packet is used.

The partition number in the fifth column and a partition name in the sixth column are the same as those shown in the component information shown in FIG. 2. However, conventionally, the manager correlates each partition to each port (that is, NIC of IOU 12-*n*) in the SH 13 separately from the above-mentioned component information.

FIG. 4 is described below. FIG. 4 is a flowchart showing the contents of a switching hub operational setting process performed by the CPU 21 of the server management unit 20. This process includes the assistance of the generation work of setting information for each port of the SH 13 and the setting of each port of the SH 13. The CPU 21 can perform this process by executing the above-mentioned control program stored in the ROM 22.

When the host I/F 24 receives the component information generated by the manager, as exemplified in FIG. 2, from the PC 30, the process shown in FIG. 4 is started, Firstly, in S101, this component information is obtained.

Then, in S102, the information of IOU 12-*n* assigned to each partition in the component information obtained in S101.

In S103, the setting screen of the operating condition for each port physically connected to a NIC provided for the obtained IOU 12-*n* is generated, transmitted to the PC 30 and is displayed.

FIG. 5A shows an example of the setting screen of the operating condition of the VLAN function as s setting screen generated in S103.

In the table shown in FIG. 5A, the partition number in the first column and a partition name in the second column are the same as those of the component information shown in FIG. 2, and are generated based on the component information obtained in S102. In this screen example, partitions 1 through 5 whose components are shown in the component information are generated.

The "IOU" of the third column is generated based on the setting of "IOU" at the right end of the table shown in FIG. 2. For example, since as to "IOU" in "A-Group server", which is partition 1 in FIG. 2, each of the upper and lower sides of column "0" are checked with a black round mark, "0*a*" and "0*b*" are generated as "IOU" of partition 1 in FIG. 2. For example, since as to the "IOU" of "File server" which is partition 2 in FIG. 2, each of the upper side of column "1" and the lower side of column "3" is marked with a black round mark, "1*a*" and "3*b*" are generated as the "IOU" of the partition 1 in FIG. 5.

"None" in the fourth column, "Port" in the fifth column and "Tag" in the sixth column of FIG. 5A are generated based on information prepared beforehand as the setting items of the operating condition of the VLAN function.

The manager generates the setting information of the operating condition of the VLAN function for the port of the SH 13, according to the display in the PC 30 of the setting screen generated as described above. Specifically, for example, one of "None", "Port" and "Tag" in FIG. 5A is selected and inputted to the PC 30 for each NIC.

FIG. 5B shows an example of the setting made for the setting screen after this setting. The setting shown in FIG. 5B is the same as the setting shown in FIG. 3B. In this way, in the table of FIG. 5B, setting information for each port of the SH 13 is correlated to a partition to use the port.

Then, the description returns to FIG. 4. In S104, the setting information instructed by the manager in this way, that is, the setting contents of the port connected to the NIC of IOU 12-*n* is obtained via the host I/F 24. Then, in S105, it is determined whether an instruction to set the SH 13 and to perform it, based on the obtained setting information, is obtained. In this case, if it is determined that the instruction to set the SH 13 and to perform it is obtained (if the determination result is YES), the process proceeds to S106. If it is not determined that the instruction to set the SH 13 and to perform it is obtained (if the determination result is NO), the process returns to S104 and the acquisition process of the setting contents of a port is continued.

In S106, each port of the SH 13 is set to the contents instructed by the manager, based on the setting information obtained in S104.

In S107, the setting information obtained in S104, that is, information indicating the setting contents of each port of the SH 13 is stored in the predetermined storage area of the RAM 23, and this switching hub operational setting process is terminated. The stored setting information is used in the switching hub operational setting modification process, which is described later. So far the switching hub operational setting process has been described. When the CPU 21 performs this process, each port of the SH 13 is set based on the component information transmitted from the PC 30.

Although in the above description, the setting information about the operating condition of the VLAN function for each port is generated and is set in the SH 13, setting information about another operating condition of the SH13 can also be generated and be set in the SH 13. FIGS. 6A and 6B show an example of the setting screen of the operation/non-operation of each port of the SH 13 as one example of the setting pf such a condition.

In the table shown in each of FIGS. 6A and 6B, the partition number in the first column, a partition name in the second column and "IOU" in the third column are the same as those in the setting screen example of the operation condition of the VLAN function for each port of the SH 13 shown in FIGS. 5A and 5B, respectively.

"Current" in the fourth column of the table in each of FIGS. 6A and 6B indicates the link status of the current port. In this case, if "Status" is "Up", it indicates that a link is established. If it is "Down", it indicates that a link is not established. "Speed/Duplex" indicates the speed of an established link and its communication method (full duplex/semi-duplex communication). Each of these items indicates the current status of a port and is not setting information.

In "Setting Status" in the right most column of the table in FIGS. 6A and 6B, it is set whether to operate a corresponding port.

If the above-mentioned switching hub operational setting process in FIG. 4 is performed, the table shown in FIG. 6A is generated by the processes in S101 through S103 and displayed on the PC 30. In this case, if the manager checks the check box located to the left of "Enable" in "Setting Status" of the table in FIG. 6A with a black square mark as shown in FIG. 6B, the corresponding port is set to operate. Then, the operation/non-operation of each port of the SH 13 is set by the processes in S104 through S107.

Besides, the switching hub operational setting process shown in FIG. 4 can assist the setting work of a variety of operating conditions, such as the use/non-use setting of the flow control function of each port, communication rate control setting at the time of broadcast, multi-cast etc., the use/non-use setting of a spanning tree function and the like, fir the setting work of the operating condition for each port of the SH 13.

Next, the operation of the server management unit 20 in the case where component information for each partition is modified after completing the setting of the SH 13 in this way is described.

FIG. 7 shows an example of the modification of component information for each partition. As shown by the meshed part of this component information, in FIG. 2, the IOU 12-n of "1b" which is assigned to partition 4 is replaced with the IOU 12-n of "2b" which is assigned to partition 5.

Conventionally, if setting information is modified in such a way, the manager must replace a partition corresponding to the IOU 12-n of "1b" with a partition corresponding to the IOU 12-n of "2b" and also replace the setting of the operating condition of each port connected to the partition corresponding to the IOU 12-n of "1b" with the setting of the operating condition of each port connected to the partition corresponding to the IOU 12-n of "2b", which are complicated and troublesome.

Then, FIG. 8 is described. FIG. 8 is a flowchart showing the contents of the switching hub operational setting modification process performed by the CPU 21 of the server management unit 20. In this process, the setting of each port of the SH 13 is modified based on the modification information of the components of each partition. In this process, as to the setting of an operating condition for each port of the SH 13, the setting of the operating condition of a port assigned to each partition before modification is taken over by a new port assigned to each partition by the modification.

When the host I/F 24 receives the information of component modification generated by the manager as shown In FIG. 7, from the PC 30, the process shown in FIG. 8 is started. Firstly, in S201, the modification contents of the component information are obtained.

In S202, the information indicating the setting contents before modification for each port of the SH 13, stored in the predetermined storage area of the RAM 23 by the process in S107 of the above-mentioned switching hub operational setting process shown in FIG. 4 is referenced. Then, in S203, the setting contents of a port connected to the NIC of IOU 12-n, assigned to a partition whose modification is instructed, before the modification are obtained.

In S204, the setting contents obtained in S203 is set in the port of the SH 13 that is connected to the NIC of IOU 12-n newly assigned to a partition whose modification is instructed after the modification, and then this switching hub operational setting modification process is terminated. In S204, the contents of this modification are also reflected in the setting contents of each port of the SH 13 stored in the predetermined storage area of the RAM 23.

So far the switching hub operational setting modification process has been described. When the CPU 21 performs this process, each port of the SH 13 is set based on the component information transmitted from the PC 30.

FIG. 9 shows an example of the setting screen after this switching hub operational setting modification process is performed in the case where the component information is modified as shown in FIG. 7 when the operating condition of a VLAN function as shown in FIG. 5B is set in each port of the SH 13. When compared with the table in FIG. 5B, it is found that in the table of FIG. 9, the IOU 12-n of "2b" and the IOU 12-n of "1b" are assigned to partitions 4 and 5, respectively, and that the setting of a port that is connected to the NIC of IOU 12-n assigned to each partition before the modification is taken over without being modified as the setting of the VLAN function of each port corresponding to these partition, of the SH 13.

Although in the above description, the setting of the SH 13 is modified by taking over setting information about the operating condition of the VLAN function for each port, the setting of the SH 13 can also be modified by taking over setting information about another operating condition described above of the SH 13.

Although so far the preferred embodiments of the present inventions have been described, the present invention is not limited to the above-mentioned preferred embodiments, and its variations and modifications are also be possible as long as the subject matter of the present invention is not deviated.

What is claimed is:

1. A computer server comprising:
a plurality of parts of a hardware resource, the parts including an input/output unit and being installed in a single cabinet together, each of the parts being assigned to one of a plurality of partitions;
a switching hub including a plurality of ports, the ports being able to be connected to the input/output unit; and
a management device to manage the computer server,
wherein
the management device comprises:
a component information acquisition unit that is configured
to obtain hardware component information indicating a relation between each of the parts of the hardware resource and each of the partitions,
to determine an input/output unit assigned to each partition by using the obtained hardware component information, to generate a setting screen for setting an operation condition of only a port of the switching hub physically connected to the determined input/output unit,
to display the generated setting screen, and
to obtain an operation condition to be set to each port inputted through the generated setting screen; and
a setting unit configured to set the obtained operation condition to the switching hub, wherein:
the obtained hardware component information contains assignment information indicating assignment of an interface unit that provides, for each port, an interface with the switching hub in the computer server;
the device further comprises a setting information acquisition unit configured to obtain setting information about each port of the switching hub, by correlating the setting information to the partition which uses the port;
the setting unit performs the setting of the port, by using both the assignment information of the interface unit and the obtained setting information;
the device further comprises a component modification information acquisition unit configured to obtain modification information of components of each partition;
when the component modification information acquisition unit obtains the modification information, the setting unit takes over the setting of the port made by using the setting information, and modifies the setting of the port made by using the obtained hardware component information, according to the modification information;
the component information acquisition unit generates, as the setting information, a setting screen for setting the operation condition, and displays the generated setting screen; and
the setting unit sets operation conditions inputted through the generated setting screen to the switching hub.

2. A device for managing a computer server including a plurality of partitions to which parts of a hardware resource of the computer server are respectively assigned, the device comprising:
 a component information acquisition unit that is configured
  to obtain hardware component information indicating a relation between each of the parts of the hardware resource and each of the partitions,
  to determine an input/output unit assigned to each partition by using the obtained hardware component information,
  to generate a setting screen for setting an operation condition of only a port of a switching hub physically connected to the determined input/output unit,
  to display the generated setting screen, and
  to obtain an operation condition to be set to each port inputted through the generated setting screen; and
 a setting unit configured to set the obtained operation condition to the switching hub, wherein:
the obtained hardware component information contains assignment information indicating assignment of an interface unit that provides, for each port, an interface with the switching hub in the computer server;
the device further comprises a setting information acquisition unit configured to obtain setting information about each port of the switching hub, by correlating the setting information to the partition which uses the port;
the setting unit performs the setting of the port, by using both the assignment information of the interface unit and the obtained setting information;
the device further comprises a component modification information acquisition unit configured to obtain modification information of components of each partition;
when the component modification information acquisition unit obtains the modification information, the setting unit takes over the setting of the port made by using the setting information, and modifies the setting of the port made by using the obtained hardware component information, according to the modification information;
the component information acquisition unit generates, as the setting information, a setting screen for setting the operation condition, and displays the generated setting screen; and
the setting unit sets operation conditions inputted through the generated setting screen to the switching hub.

3. A method for managing a computer server including a plurality of partitions to which parts of a hardware resource of the computer server are respectively assigned, the method comprising:
 obtaining hardware component information indicating a relation between each of the parts of the hardware resource and each of the partitions;
 determining an input/output unit assigned to each of the partitions by using the obtained hardware component information;
 generating a setting screen for setting an operation condition of only a port of a switching hub physically connected to the determined input/output unit;
 displaying the generated setting screen;
 obtaining an operation condition to be set to each port inputted through the generated setting screen; and
 setting the obtained operation condition to the switching hub, wherein:
the obtained hardware component information contains assignment information indicating assignment of an interface unit that provides, for each port, an interface with the switching hub in the computer server;
the method further comprises obtaining setting information about each port of the switching hub, by correlating the setting information to the partition which uses the port;
the setting of the port is performed by using both the assignment information of the interface unit and the obtained setting information in the setting the obtained operation condition to the switching hub;
the method further comprises obtaining modification information of components of each partition;
when the component modification information is obtained, the setting of the port made by using the setting information is taken over and the setting of the port made by using the obtained hardware component information is modified according to the modification information; and
the generated setting screen indicates a correspondence between each partition and the input/output unit assigned to the partition.

4. The method according to claim 3, wherein
the generated setting screen indicates setting items of the operating condition for each of the indicated input/output unit, and
the setting condition is set to the ports by using the setting items that are selected through the generated setting screen.

5. A device for managing a computer server including a plurality of partitions to which parts of a hardware resource of the computer server are respectively assigned, the device comprising:

a component information acquisition unit that is configured
- to obtain hardware component information indicating a relation between each of the parts of the hardware resource and each of the partitions,
- to determine an input/output unit assigned to each partition by using the obtained hardware component information,
- to generate a setting screen for setting an operation condition of only a port of a switching hub physically connected to the determined input/output unit,
- to display the generated setting screen, and
- to obtain an operation condition to be set to each port inputted through the generated setting screen; and a setting unit configured to set the obtained operation condition to the switching hub, wherein:

the obtained hardware component information contains assignment information indicating assignment of an interface unit that provides, for each port, an interface with the switching hub in the computer server;

the device further comprises a setting information acquisition unit configured to obtain setting information about each port of the switching hub, by correlating the setting information to the partition which uses the port;

the setting unit performs the setting of the port, by using both the assignment information of the interface unit and the obtained setting information;

the device further comprises a component modification information acquisition unit configured to obtain modification information of components of each partition;

when the component modification information acquisition unit obtains the modification information, the setting unit takes over the setting of the port made by using the setting information, and modifies the setting of the port made by using the obtained hardware component information, according to the modification information; and the component information acquisition unit includes an internal memory that stores the obtained component information so that the component information acquisition unit does not need to reacquire the obtained component information during the modification of the setting of the port made by using the obtained hardware component information.

6. A computer server comprising:

a plurality of parts of a hardware resource, the parts including an input/output unit and being installed in a single cabinet together, each of the parts being assigned to one of a plurality of partitions;

a switching hub including a plurality of ports, the ports being able to be connected to the input/output unit; and a management device to manage the computer server, wherein the management device comprises:

a component information acquisition unit that is configured
- to obtain hardware component information indicating a relation between each of the parts of the hardware resource and each of the partitions,
- to determine an input/output unit assigned to each partition by using the obtained hardware component information,
- to generate a setting screen for setting an operation condition of only a port of the switching hub physically connected to the determined input/output unit,
- to display the generated setting screen, and
- to obtain an operation condition to be set to each port inputted through the generated setting screen; and a setting unit configured to set the obtained operation condition to the switching hub, wherein:

the obtained hardware component information contains assignment information indicating assignment of an interface unit that provides, for each port, an interface with the switching hub in the computer server;

the device further comprises a setting information acquisition unit configured to obtain setting information about each port of the switching hub, by correlating the setting information to the partition which uses the port;

the setting unit performs the setting of the port, by using both the assignment information of the interface unit and the obtained setting information;

the device further comprises a component modification information acquisition unit configured to obtain modification information of components of each partition;

when the component modification information acquisition unit obtains the modification information, the setting unit takes over the setting of the port made by using the setting information, and modifies the setting of the port made by using the obtained hardware component information, according to the modification information; and the component information acquisition unit includes an internal memory that stores the obtained component information so that the component information acquisition unit does not need to reacquire the obtained component information during the modification of the setting of the port made by using the obtained hardware component information.

\* \* \* \* \*